United States Patent
Pisklak et al.

(10) Patent No.: US 10,894,911 B2
(45) Date of Patent: Jan. 19, 2021

(54) CONTROLLED ACTIVATION OF EXTENDED-LIFE CEMENT COMPOSITIONS

(71) Applicant: Halliburton Energy Services, Inc., Houston, TX (US)

(72) Inventors: Thomas Jason Pisklak, Cypress, TX (US); Kyriacos Agapiou, Houston, TX (US); Samuel J. Lewis, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 31 days.

(21) Appl. No.: 15/580,205

(22) PCT Filed: Jul. 8, 2015

(86) PCT No.: PCT/US2015/039603
§ 371 (c)(1),
(2) Date: Dec. 6, 2017

(87) PCT Pub. No.: WO2017/007473
PCT Pub. Date: Jan. 12, 2017

(65) Prior Publication Data
US 2018/0148629 A1     May 31, 2018

(51) Int. Cl.
*C09K 8/467* (2006.01)
*C04B 28/06* (2006.01)
(Continued)

(52) U.S. Cl.
CPC .......... *C09K 8/467* (2013.01); *C04B 20/1025* (2013.01); *C04B 20/1033* (2013.01);
(Continued)

(58) Field of Classification Search
CPC . C09K 8/467; C04B 20/1033; C04B 20/1037; C04B 20/1048; C04B 22/062;
(Continued)

(56) References Cited

U.S. PATENT DOCUMENTS

| | | | |
|---|---|---|---|
| 4,455,171 A * | 6/1984 | Spensley ................ | C09K 17/10 106/694 |
| 6,527,051 B1 * | 3/2003 | Reddy ..................... | B01J 13/22 166/300 |

(Continued)

FOREIGN PATENT DOCUMENTS

| WO | 2015034543 | 3/2015 | |
|---|---|---|---|
| WO | WO-2015034543 A1 * | 3/2015 | ......... C04B 40/0658 |
| WO | 2017007473 | 1/2017 | |

OTHER PUBLICATIONS

Ciment Fondu Product Data Sheet (Year: 2018).*
(Continued)

*Primary Examiner* — Crystal J Miller
(74) *Attorney, Agent, or Firm* — Thomas Rooney; C. Tumey Law Group PLLC

(57) ABSTRACT

Methods, compositions, and systems for cementing are included. The method comprises providing a cement composition comprising calcium-aluminate cement, water, a cement set retarder, and a cement set activator. The method further comprises introducing the cement composition into a subterranean formation and allowing the cement composition to set in the subterranean formation. The cement composition has a thickening time of about two hours or longer.

20 Claims, 2 Drawing Sheets

(51) Int. Cl.
*C04B 20/10* (2006.01)
*C04B 22/06* (2006.01)
*C04B 22/08* (2006.01)
*C04B 24/06* (2006.01)
*C04B 40/06* (2006.01)
*E21B 33/14* (2006.01)
*C04B 103/10* (2006.01)
*C04B 103/20* (2006.01)
*C04B 103/12* (2006.01)
*C04B 103/22* (2006.01)

(52) U.S. Cl.
CPC ...... *C04B 20/1037* (2013.01); *C04B 20/1048* (2013.01); *C04B 22/062* (2013.01); *C04B 22/082* (2013.01); *C04B 24/06* (2013.01); *C04B 28/06* (2013.01); *C04B 40/0658* (2013.01); *E21B 33/14* (2013.01); *C04B 2103/10* (2013.01); *C04B 2103/12* (2013.01); *C04B 2103/20* (2013.01); *C04B 2103/22* (2013.01)

(58) Field of Classification Search
CPC ....... C04B 22/082; C04B 24/06; C04B 28/06; C04B 28/40; C04B 28/0658; C04B 2103/10; C04B 2103/12; C04B 2103/20; C04B 2103/22; E21B 33/14
See application file for complete search history.

(56) References Cited

U.S. PATENT DOCUMENTS

| | | | |
|---|---|---|---|
| 7,326,290 B2 | 2/2008 | Guinot et al. | |
| 9,227,872 B2 | 1/2016 | Pisklak et al. | |
| 2003/0234103 A1 | 12/2003 | Lee et al. | |
| 2007/0089643 A1* | 4/2007 | Roddy | C04B 28/06 106/692 |
| 2009/0011207 A1* | 1/2009 | Dubey | C04B 20/1051 428/219 |
| 2009/0137431 A1 | 5/2009 | Reddy et al. | |
| 2010/0175589 A1 | 7/2010 | Charpentier et al. | |
| 2010/0186955 A1* | 7/2010 | Saasen | C04B 28/02 166/288 |
| 2010/0193126 A1 | 8/2010 | Saasen et al. | |
| 2010/0240556 A1* | 9/2010 | Keys | C04B 28/34 507/260 |
| 2013/0248183 A1* | 9/2013 | Pisklak | C09K 8/428 166/292 |
| 2014/0083701 A1 | 3/2014 | Boul et al. | |
| 2014/0196904 A1 | 7/2014 | Fontenelle et al. | |
| 2014/0202698 A1 | 7/2014 | Pisklak et al. | |
| 2014/0216746 A1 | 8/2014 | Ballew et al. | |
| 2014/0299024 A1* | 10/2014 | Seidl | C04B 20/104 106/822 |
| 2016/0122245 A1* | 5/2016 | Seidl | C04B 20/12 106/657 |
| 2017/0001908 A1* | 1/2017 | Agapiou | C09K 8/46 |

OTHER PUBLICATIONS

Calcium Aluminate Mineral Suspensions, an Innovative Liquid Binder for Construction and Coating Industries, Presented by Pascal Taquet on Mar. 21, 2013.

International Search Report and Written Opinion for Application No. PCT/US2015/039603 dated Sep. 30, 2015.

* cited by examiner

CONTROLLED ACTIVATION OF EXTENDED-LIFE CEMENT COMPOSITIONS

BACKGROUND

Methods of delaying the activation of extended-life cement compositions and, more particularly, methods of controlling the activation of extended-life cement compositions comprising calcium-aluminate cement in well operations are provided.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string may prevent the migration of fluids in the annulus and may also protect the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, extended-life cement compositions have been used. In contrast to conventional cement compositions that set and harden upon preparation, extended-life cement compositions are characterized by being capable of remaining in a pumpable fluid state for about one day or longer (e.g., about 7 days, about 2 weeks, about 2 years or more) at room temperature (e.g., about 80° F.) in storage. When desired for use, the extended-life cement compositions should be capable of activation and consequently develop reasonable compressive strengths. For example, an extended-life cement composition that is activated may set into a hardened mass. Among other things, extended-life cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While extended-life cement compositions have been developed heretofore, challenges exist with their successful use in subterranean cementing operations. For example, some extended-life compositions may have limited use at lower temperatures as they may not develop sufficient compressive strength when used in subterranean formations having lower bottom hole static temperatures. In addition, it may be problematic to activate some extended-life cement compositions while maintaining acceptable thickening times and compressive strength development.

BRIEF DESCRIPTION OF THE DRAWINGS

These drawings illustrate certain aspects of some of the embodiments of the present method, and should not be used to limit or define the method.

DETAILED DESCRIPTION

Figure 1:
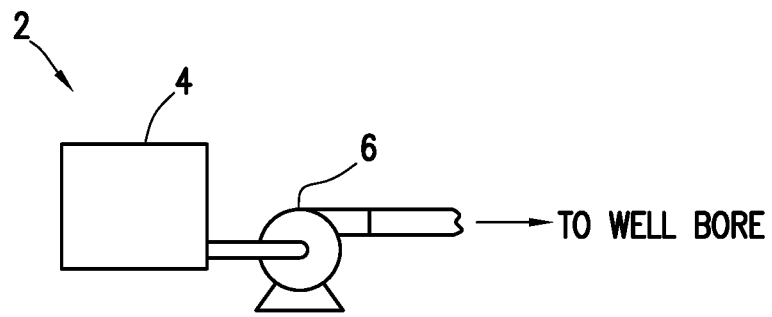
FIG. 1 illustrates a system for preparation and delivery of an extended-life calcium aluminate cement composition to a wellbore in accordance with certain examples.

Methods of delaying the activation of extended-life cement compositions and, more particularly, methods of controlling the activation of extended-life cement compositions comprising calcium-aluminate cement in well operations are provided.

As used herein, the extended-life cement compositions may comprise a calcium aluminate cement, water, a cement set retarder, and a delayed-release cement set activator. Optionally, the extended-life cement compositions may comprise a calcium-aluminate cement set accelerator and/or a dispersant. Advantageously, the extended-life cement compositions may be capable of remaining in a pumpable fluid state for an extended period of time, i.e., they may be capable of remaining in a pumpable fluid state for at least about one day or longer (e.g., about 7 days, about 2 weeks, about 2 years or more) at room temperature (e.g., about 80° F.) in storage. Generally, the extended-life cement compositions may develop compressive strength after activation. Advantageously, the extended-life cement compositions may develop reasonable compressive strengths at relatively low temperatures (e.g., temperatures of about 70° F. or less to about 140° F.). Thus, while the extended-life cement compositions may be suitable for a number of subterranean cementing operations, they may be particularly suitable for use in subterranean formations having relatively low bottom hole static temperatures, e.g., temperatures of about 70° F. or less to about 140° F. Alternatively, the extended-life cement compositions may be used in subterranean formations having bottom hole static temperatures up to 450° F. or higher.

The extended-life cement compositions may comprise a calcium aluminate cement. Any calcium aluminate cement may be suitable for use. Calcium aluminate cements may be described as cements that comprise calcium aluminates in an amount greater than 50% by weight of the dry calcium aluminate cement (i.e., the calcium aluminate cement before water or any additives are added). A calcium aluminate may be defined as any calcium aluminate including, but not limited to, monocalcium aluminate, monocalcium dialuminate, tricalcium aluminate, dodecacalcium hepta-aluminate, monocalcium hexa-aluminate, dicalcium aluminate, pentacalcium trialuminate, tetracalcium trialuminate, and the like. One example of a suitable such calcium aluminate is SECAR 71® calcium aluminate, which is commercially available from Kerneos™ Aluminate Technologies. Without limitation, the calcium aluminate cement may be included in the extended-life cement compositions in an amount in the range of from about 10% to about 80% by weight of the extended-life cement compositions. For example, the calcium aluminate cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the extended-life cement composition. One of ordinary skill in the art, with the benefit of this disclosure, should be able to choose an appropriate type of calcium aluminate cement and should recognize the appropriate amount of the calcium aluminate cement to include for a chosen application.

The extended-life cement compositions may comprise a cement set retarder. Examples of the cement set retarder may include, but should not be limited, to hydroxycarboxylic acids such as citric, tartaric, gluconic acids or their respective salts, boric acid or its respective salt, and combinations thereof. A commercial example of a suitable cement set retarder is Fe-2™ Iron Sequestering Agent available from Halliburton Energy Services, Inc., Houston, Tex. Generally, the cement set retarder may be present in the extended-life cement compositions in an amount sufficient to delay the setting for a desired time. Without limitation, the cement set retarder may be present in the extended-life cement compositions in an amount in the range of from about 0.01% to about 10% by weight of the calcium aluminate cement. More particularly, the cement set retarder may be present in an amount ranging between any of and/or including any of about 0.01%, about 0.1%, about 1%, about 2%, about 4%, about 6%, about 8%, or about 10% by weight of the calcium aluminate cement. Additionally, cement set retarders may be used that do not undesirably affect the extended-life cement compositions, for example, by increasing the pH of the extended-life cement compositions unless desired. One of ordinary skill in the art, with the benefit of this disclosure, should be able to choose an appropriate type of cement set retarder and should recognize the appropriate amount of the cement set retarder to include for a chosen application.

The extended-life cement compositions may comprise water. The water may be from any source provided that it does not contain an excess of compounds that may undesirably affect other components in the extended-life cement compositions, for example, it may be desired that no compounds in the water raise the alkalinity of the extended-life cement compositions unless it is desirable to do so. The water may comprise fresh water or salt water. Salt water generally may include one or more dissolved salts therein and may be saturated or unsaturated as desired for a particular application. Seawater or brines may be suitable for use in some applications. Further, the water may be present in an amount sufficient to form a pumpable composition. Without limitation, the water may be present in the extended-life cement compositions in an amount in the range of from about 20% to about 90% by weight of the extended-life cement composition. For example, the water may be present in an amount ranging between any of and/or including any of about 20%, about 25%, about 30%, about 35%, about 40%, 45%, about 50%, about 55%, about 60%, about 65%, about 70%, about 75%, about 80%, about 85%, or about 90% by weight of the extended-life cement composition. One of ordinary skill in the art, with the benefit of this disclosure, should be able to recognize the appropriate amount of water to include for a chosen application.

The extended-life cement compositions may optionally comprise a delayed-release cement set activator when it is desirable to induce setting of the extended-life cement compositions. The delayed-release cement set activator may comprise a cement set activator that has a delayed-release into the extended-life cement composition. Certain cement set activators may additionally function as cement set accelerators and may accelerate the development of compressive strength in the extended-life cement compositions in addition to activating the extended-life cement compositions. A delayed-release cement set activator may be any alkaline species that increases the pH of the extended-life cement compositions sufficiently to initiate hydration reactions in the extended-life cement compositions, but also does not otherwise interfere with the setting of the extended-life cement compositions. Without being limited by theory, it is believed that activation may be induced due to the cement set activator removing the hydration barrier caused by the cement set retarders in the extended-life cement compositions. Moreover, the large exotherm associated with the setting of the calcium-aluminate cement is believed to provide a large enough temperature increase that the extended-life cement compositions may be able to set at temperatures much lower than other types of extended-life cement compositions. Potential examples of delayed-release cement set activators may include, but should not be limited to: Groups IA and IIA hydroxides such as sodium hydroxide, magnesium hydroxide, and calcium hydroxide; alkaline aluminates such as sodium aluminate; Portland cement; and the like. Without limitation, the delayed-release cement set activator may be present in the extended-life cement compositions in an amount in the range of from about 0.01% to about 10% by weight of the calcium aluminate cement. More particularly, the delayed-release cement set activator may be present in an amount ranging between any of and/or including any of about 0.01%, about 0.1%, about 1%, about 2%, about 4%, about 6%, about 8%, or about 10% by weight of the calcium aluminate cement.

As discussed above, the cement set activators may comprise calcium hydroxide which may be referred to as hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included, for example, to activate the extended-life cement compositions.

As discussed above, the cement set activator may comprise a Portland cement. Examples of such Portland cements, include, but are not limited to Classes A, C, H, or G cements according to the American Petroleum Institute, *API Specification for Materials and Testing for Well Cements*, API Specification 10, Fifth Ed., Jul. 1, 1990. In addition, the Portland cement may include Portland cements classified as ASTM Type I, II, III, IV, or V.

As described above, the cement set activator may have a delayed-release into the extended-life cement composition. For example, the cement set activator may be combined with a binder to produce a delayed-release cement set activator. The binder may be used to provide structure for which to hold a cement set activator in one or more masses to allow for the cement set activator to be portioned out. Suitable binders may include, but are not limited to, silica gel, aluminosilicate, chitosan, and cellulose, derivatives thereof, and combinations thereof. The amount of binder used is dependent upon the chosen cement set activator and the desired degree to which the chosen cement set activator is to be bound.

The set activator and binder may be combined to form a slurry or paste, and then allowed to dry and harden forming the delayed-release cement set activator. Once in a hardened form, the delayed-release cement set activator may be cut or broken into small particles and sized with a sieve. Generally, the particles should have a size that allows for the particles to be transportable into a subterranean formation and mixed with extended-life cement composition. In some examples, the particles may have a size in a range of about 30 mesh to about 80 mesh. Mesh as used herein, refers to U.S. standard size mesh.

Due to the bound nature of this sized-particulate form of the delayed-release cement set activator, the delayed-release cement set activator may be released slowly and thus activate the extended-life cement composition at a slower rate relative to a cement set activator that has not been combined with a binder. In some examples, the release of the delayed-release cement set activator may be further delayed by encapsulating the bound cement set activator with an outer coating (e.g., a degradable coating that degrades downhole) that further impairs the release of the delayed-release cement set activator. As used herein, the term "coating," or "outer coating" and the like, does not imply any particular degree of coating on the particulate. In particular, the terms "coat" or "coating" do not imply 100% coverage by the coating on the particulate. In some embodiments, an outer coating, including degree of coating, may be used to control the rate of release of the delayed-release cement set activator. For example, in a specific example, the outer coating may be configured to impair the release of the delayed-release cement set activator until the extended-life cement composition is in the portion of the subterranean formation to be cemented, wherein the outer coating may degrade due to elevated temperatures within the subterranean formation and the delayed-release cement set activator may be released throughout the extended-life cement composition. The time period for delay of the release of the cement set activator may be in a range between any of and/or including any of about 1 minute to about 24 hours. For example, the time period for the delay of release may be in a range between any of and/or including any of about 1 minute, about 5 minutes, about 30 minutes, about 1 hour, about 6 hours, about 12 hours, or about 24 hours. Operational factors such as pump rate, conduit dimensions, and the like may influence the time period for delay.

The outer coating may be formed of a water-insoluble material with a melting point, for example, of from about 100° F. to about 500° F. A water insoluble material may prevent the outer coating from dissolving in the extended-life cement compositions until desired. Suitable outer coating materials may include, but should not be limited to, polysaccharides such as dextran and cellulose, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, or a combination thereof.

The delayed-release cement set activator (with or without outer coating) may slowly degrade or disassociate in the extended-life cement compositions. This may result in changing the pH of the extended-life cement composition downhole. The release of the pH altering component from the delayed-release cement set activator may be controlled by time and/or temperature. The delayed-release cement set activator may be formulated to release the pH altering component over time in the wellbore or once the delayed-release cement set activator is exposed to a certain temperature within the wellbore. Because of these adjustable properties, a delayed-release cement set activator may be added to the extended-life cement compositions before and/or during storage, whereas cement set-activators which do not comprise a delayed-release may only be added to an extended-life cement compositions as the extended-life cement composition is introduced into the subterranean formation or after the extended-life cement composition has been introduced into the subterranean formation. As such, the delayed-release cement set activator may be dry blended with the extended-life cement composition and stored, or may be added to an extended-life cement composition slurry and stored. In these specific examples, the additional mixing steps of adding a nondelayed-release cement set activator may be eliminated, and storage and mixing operations may be simplified as a result. If desired, the delayed-release cement set activator may also be added to the extended-life cement composition immediately before introducing the extended-life cement composition into the subterranean formation, or alternatively, the delayed-release cement set activator may be added to the extended-life cement composition as the extended-life cement composition is introduced into the subterranean formation.

It is to be understood that the delayed-release cement set activator may also sufficiently activate any retarded or dormant system where hydration has been blocked or slowed. Therefore, the delayed-release cement activator may be used in a variety of cementing systems including those that do not possess extended-life properties and those that do not utilize calcium-aluminate cement. Further, the delayed-release properties of the delayed-release cement set activator may also be used to effect an analogous delayed activation in the other types of cementing systems.

As previously mentioned, the extended-life cement compositions may optionally comprise a dispersant. Examples of suitable dispersants may include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Additionally, polyoxyethylene phosphonates and polyox polycarboxylates may be used. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc., Houston, Tex. The Liquiment® 514L dispersant may comprise 36% by weight of the polycarboxylated ether in water.

While a variety of dispersants may be used, some dispersants used, may be used with specific cement set retarders. Additionally, dispersants that do not undesirably affect the extended-life cement compositions, for example, by inducing premature setting may be used. One of ordinary skill in the art, with the benefit of this disclosure, should recognize the appropriate type of dispersant to include for a chosen application.

Without limitation, the dispersant may be included in the extended-life cement compositions in an amount in the range of from about 0.01% to about 5% by weight of the calcium aluminate cement. More particularly, the dispersant may be present in an amount ranging between any of and/or including any of about 0.01%, about 0.1%, about 0.5%, about 1%, about 2%, about 3%, about 4%, or about 5% by weight of the calcium aluminate cement. One of ordinary skill in the art, with the benefit of this disclosure, will recognize the appropriate amount of dispersant to include for a chosen application.

The extended-life cement compositions may optionally comprise a lithium salt which may function as cement set accelerator. A cement set accelerator may accelerate the development of compressive strength once an extended-life cement composition has been activated, but the cement set accelerator, unless otherwise noted, does not itself induce activation of the extended-life cement composition. Examples of suitable lithium salts include, without limitation, lithium sulfate and lithium carbonate. Without being limited by theory, it is believed that the lithium ions increase the number of nucleation sites for hydrate formation in the calcium aluminate cement. Thus, when the calcium aluminate cement is activated by combination with cement set activator, the presence of the lithium salts may accelerate the development of compressive strength of the calcium aluminate cement. Preferably, the lithium salt should be added only to retarded or dormant calcium aluminate cements. Introduction of a lithium salt to a non-retarded or non-dormant calcium aluminate cement may increase the alkalinity of the calcium aluminate cement by a large enough magnitude to induce premature setting of the calcium aluminate cement, based of course, on the specific calcium aluminate cement used and the other components in the composition. However, lithium salts added to retarded or dormant calcium aluminate cements may prevent this risk. Without limitation, the lithium salt may be included in the extended-life cement compositions in an amount in the range of about 0.01% to about 10% by weight of the calcium aluminate cement. More particularly, the lithium salt may be present in an amount ranging between any of and/or including any of about 0.01%, about 0.1%, about 0.5%, about 1%, about 2%, about 3%, about 4%, about 5%, or about 10% by weight of the calcium aluminate cement. One of ordinary skill in the art, with the benefit of this disclosure, should recognize the appropriate amount of lithium salt to include for a chosen application.

The extended-life cement compositions may comprise a polyphosphate. Any polyphosphate-containing compound, phosphate salt, or the like may be sufficient. Examples of polyphosphates may include sodium polyphosphates, such as sodium hexametaphosphate, sodium polytriphosphate; potassium polyphosphates, such as potassium tripolyphosphate, the like, or a combination thereof. A commercial example of a suitable polyphosphate is CALGON® sodium polyphosphate, available from CALGON CARBON CORPORATION®, Pittsburgh, Pa. The polyphosphate may be added to the other components of the extended-life cement composition as an aqueous solution. Alternatively, the polyphosphate may be added to the other components of the extended-life cement composition as a dry solid, or as dry solid particles. The polyphosphate may be included in the extended-life cement compositions in an amount desirable for a particular application as will be evident to those of ordinary skill in the art with the benefit of this disclosure. For example, the polyphosphate may be present in the extended-life cement compositions an amount of about 0% to about 30% by weight of the extended-life cement compositions. For example, the polyphosphate may be present in an amount ranging between any of and/or including any of about 0%, about 5%, about 10%, about 15%, about 20%, about 25%, or about 30% by weight of the extended-life cement composition. One of ordinary skill in the art, with the benefit of this disclosure, should be able to choose an appropriate type of polyphosphate and should recognize the appropriate amount of the polyphosphate to include for a chosen application.

The extended-life cement compositions may optionally comprise a filler material. The filler material used for the extended-life cement compositions may comprise any suitable filler material, provided said filler material does not undesirably raise the alkalinity of the extended-life cement compositions as an increase in alkalinity may induce the premature setting of the extended-life cement compositions. Without limitation, the filler material may include silica, sand, fly ash, or silica fume. Generally, the filler material may be present in the extended-life cement compositions in an amount sufficient to make the system economically competitive. Without limitation, the filler material may be present in the extended-life cement compositions in an amount in the range of from about 0.01% to about 100% by weight of the calcium aluminate cement. More particularly, the filler material may be present in an amount ranging between any of and/or including any of about 0.01%, about 0.1%, about 1%, about 10%, about 25%, about 50%, about 75%, or about 100% by weight of the calcium aluminate cement. One of ordinary skill in the art, with the benefit of this disclosure, should recognize the appropriate amount of filler material to include for a chosen application.

Other additives suitable for use in subterranean cementing operations may also be added to the extended-life cement compositions as deemed appropriate by one of ordinary skill in the art. Examples of such additives include, but are not limited to, weighting agents, lightweight additives, gas-generating additives, mechanical property enhancing additives, lost-circulation materials, defoaming agents, foaming agents, thixotropic additives, and combinations thereof. Specific examples of these, and other, additives include silica (e.g., crystalline silica, amorphous silica, fumed silica, etc.), salts, fibers, hydratable clays, shale (e.g., calcined shale, vitrified shale, etc.), microspheres, diatomaceous earth, natural pozzolan, resins, latex, combinations thereof, and the like. Other optional additives may also be included, including, but not limited to, cement kiln dust, lime kiln dust, fly ash, slag cement, shale, zeolite, metakaolin, pumice, perlite, lime, silica, rice husk ash, small-particle size cement, combinations thereof, and the like. A person having ordinary skill in the art, with the benefit of this disclosure, should be able to determine the type and amount of additive useful for a particular application and desired result.

Weighting agents are typically materials that weigh more than water and may be used to increase the density of the extended-life cement compositions. By way of example, weighting agents may have a specific gravity of about 2 or higher (e.g., about 2, about 4, etc.). Examples of weighting agents that may be used include, but are not limited to, hematite, hausmannite, and barite, and combinations thereof. Specific examples of suitable weighting agents include HI-DENSE® weighting agent, available from Halliburton Energy Services, Inc.

Lightweight additives may be included in the extended-life cement compositions to, for example, decrease the density of the extended-life cement compositions. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, combinations thereof, or other lightweight additives known in the art.

Gas-generating additives may be included in the extended-life cement compositions to release gas at a predetermined time, which may be beneficial to prevent gas migration from the formation through the extended-life cement composition before it hardens. The generated gas may combine with or inhibit the permeation of the extended-life cement composition by formation gas. Examples of suitable gas-generating additives include, but are not limited to, metal particles (e.g., aluminum powder) that react with an alkaline solution to generate a gas.

Mechanical-property-enhancing additives may be included in the extended-life cement compositions to, for example, ensure adequate compressive strength and long-term structural integrity. These properties can be affected by the strains, stresses, temperature, pressure, and impact effects from a subterranean environment. Examples of mechanical property enhancing additives include, but are not limited to, carbon fibers, glass fibers, metal fibers, mineral fibers, silica fibers, polymeric elastomers, and latexes.

Lost-circulation materials may be included in the extended-life cement compositions to, for example, help prevent the loss of fluid circulation into the subterranean formation. Examples of lost-circulation materials include but are not limited to, cedar bark, shredded cane stalks, mineral fiber, mica flakes, cellophane, calcium carbonate, ground rubber, polymeric materials, pieces of plastic, grounded marble, wood, nut hulls, plastic laminates (Formica® laminate), corncobs, and cotton hulls.

Defoaming additives may be included in the extended-life cement compositions to, for example, reduce the tendency for the extended-life cement compositions to foam during mixing and pumping of the extended-life cement compositions. Examples of suitable defoaming additives include, but are not limited to, polyol silicone compounds. Suitable defoaming additives are available from Halliburton Energy Services, Inc., under the product name D-AIR™ defoamers.

Foaming additives (e.g., foaming surfactants) may be included in the extended-life cement compositions to, for example, facilitate foaming and/or stabilize the resultant foam formed therewith. Examples of suitable foaming additives include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. An example of a suitable foaming additive is ZONESEALANT™ 2000 agent, available from Halliburton Energy Services, Houston, Tex.

Thixotropic additives may be included in the extended-life cement compositions to, for example, provide an extended-life cement composition that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

Those of ordinary skill in the art will appreciate that the extended-life cement compositions generally should have a density suitable for a particular application. By way of example, the extended-life cement compositions may have a density in the range of from about 4 pounds per gallon ("lb/gal") to about 20 lb/gal. For example, the extended-life cement compositions may have a density in the range of from about 8 lb/gal to about 17 lb/gal. The extended-life cement compositions may be foamed or unfoamed or may comprise other means to reduce their densities, such as hollow microspheres, low-density elastic beads, or other density-reducing additives known in the art. The density may be reduced after storage, but prior to placement in a subterranean formation. Weighting agents may be used to increase the density of the extended-life cement compositions. Examples of suitable weighting agents may include barite, hematite, hausmannite, calcium carbonate, siderite, ilmenite, or combinations thereof. Without limitation, the weighting agents may have a specific gravity of about 3 or greater. Those of ordinary skill in the art, with the benefit of this disclosure, will recognize the appropriate density required for a particular application.

As previously mentioned, the extended-life cement compositions may have a delayed set in that they may be capable of remaining in a pumpable fluid state for about one day or longer (e.g., about 1 day, about 2 weeks, about 2 years or more) at room temperature (e.g., about 80° F.) in storage. For example, the extended-life cement compositions may remain in a pumpable fluid state for a period of time from about 1 day to about 7 days or more. In some embodiments, the extended-life cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

As discussed above, when desired for use, the extended-life cement compositions may be activated (e.g., by addition of a cement set activator) to set into a hardened mass. The term "activate", as used herein, refers to the activation of an extended-life cement composition and in certain cases may also refer to the acceleration of the setting of an extended-life cement composition if the mechanism of said activation also accelerates the development of compressive strength. By way of example, a cement set activator may be added to an extended-life cement composition to activate the extended-life cement composition. An extended-life cement composition that has been activated may set to form a hardened mass in a time period in the range of from about 1 hour to about 12 days. For example, activated extended-life cement compositions may set to form a hardened mass in a time period ranging between any of and/or including any of about 1 hour, about 6 hours, about 12 hours, about 1 day, about 2 days, about 4 days, about 6 days, about 8 days, about 10 days, or about 12 days.

The extended-life cement compositions may set to have a desirable compressive strength after activation. Compressive strength is generally the capacity of a material or structure to withstand axially directed pushing forces. The compressive strength may be measured at a specified time after the activation of the extended-life cement compositions while the extended-life cement composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ Ultrasonic Cement Analyzer, available from Fann Instrument Company, Houston, Tex. Compressive strength values may be determined in accordance with API RP 10B-2, *Recommended Practice for Testing Well Cements*, First Edition, July 2005.

By way of example, extended-life cement compositions that have been activated may develop a 24-hour compressive strength in the range of from about 50 psi to about 5000 psi, alternatively, from about 100 psi to about 4500 psi, or alternatively from about 500 psi to about 4000 psi. In particular, the extended-life cement compositions may develop a compressive strength in 24 hours of at least about 50 psi, at least about 100 psi, at least about 500 psi, or more. The compressive strength values may be determined using destructive or non-destructive methods at any temperature, however compressive strength development at temperatures ranging from 70° F. to 140° F. may be of particular importance for potential use in subterranean formations having relatively low bottom hole static temperatures.

In some examples, the extended-life cement compositions may have desirable thickening times. Thickening time typically refers to the time a fluid, such as an extended-life cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. Without limitation, the extended-life cement compositions may have thickening times greater than about 1 hour, alternatively, greater than about 2 hours, greater than about 15 hours, greater than about 30 hours, greater than about 100 hours, or alternatively greater than about 190 hours at 3,000 psi and temperatures in a range of from about 50° F. to about 450° F., alternatively, in a range of from about 70° F. to about 140° F., and alternatively at a temperature of about 100° F. As will be illustrated in the examples below, thickening times may be controlled by the degree to which the pH of the extended-life cement compositions is increased. This is related, to a degree, to the concentration of the cement set activator and allows for a quantitative method of controlling the set time of the extended-life cement compositions.

As will be appreciated by those of ordinary skill in the art, the extended-life cement compositions may be used in a variety of subterranean operations, including primary and remedial cementing. For example, an extended-life cement composition may be provided that comprises a calcium aluminate cement, water, a cement set retarder, a delayed-release cement set activator, and optionally a dispersant, cement set accelerator, and/or a filler material. When desired for use, the extended-life cement composition may be pumped downhole where it may be introduced into a subterranean formation and allowed to set therein. As used herein, introducing the extended-life cement composition into a subterranean formation includes introduction into any portion of the subterranean formation, including, without limitation, into a wellbore drilled into the subterranean formation, into a near wellbore region surrounding the wellbore, or into both.

Additional applications may include storing extended-life cement compositions. For example, an extended-life cement composition may be provided that comprises a calcium aluminate cement, water, a cement set retarder, a delayed-release cement set activator, and optionally a dispersant, cement set accelerator, and/or a filler material. The extended-life cement composition may be stored in a vessel or other suitable container. The extended-life cement compositions may be stored and then pumped downhole when ready for use. The extended-life cement compositions may be permitted to remain in storage for a desired time period. For example, the extended-life cement compositions may remain in storage for a time period of about 1 day, about 2 weeks, about 2 years, or longer. For example, the extended-life cement compositions may remain in storage for a time period of about 1 day, about 2 days, about 5 days, about 7 days, about 10 days, about 20 days, about 30 days, about 40 days, about 50 days, about 60 days, or up to about 2 years. When desired for use, the extended-life cement compositions may be introduced into a subterranean formation and allowed to set therein.

In primary cementing applications, for example, the extended-life cement compositions may be introduced into an annular space between a conduit located in a wellbore and the walls of a wellbore (and/or a larger conduit in the wellbore), wherein the wellbore penetrates the subterranean formation. The extended-life cement compositions may be allowed to set in the annular space to form an annular sheath of hardened cement. The extended-life cement compositions may form a barrier that prevents the migration of fluids in the wellbore. The extended-life cement compositions may also, for example, support the conduit in the wellbore.

In remedial cementing applications, the extended-life cement compositions may be used, for example, in squeeze-cementing operations or in the placement of cement plugs. By way of example, the extended-life compositions may be placed in a wellbore to plug an opening (e.g., a void or crack) in the subterranean formation, in a gravel pack, in the conduit, in the cement sheath, and/or between the cement sheath and the conduit (e.g., a microannulus).

A method for cementing may be provided. The method may be used in conjunction with one or more of the methods, compositions, and/or systems illustrated in FIGS. 1-3. The method may comprise providing an extended-life cement composition comprising calcium-aluminate cement, water, a cement set retarder, and a delayed-release cement set activator; introducing the extended-life cement composition into a subterranean formation; and allowing the extended-life cement composition to set in the subterranean formation; wherein the extended-life cement composition has a thickening time of about two hours or longer. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The delayed-release cement set activator may be selected from the group consisting of Groups IA and IIA hydroxides; alkaline aluminates; Portland cement, and the like. The delayed-release cement set activator may comprise a binder selected from the group consisting of silica gel, aluminosilicate, chitosan, cellulose, derivatives thereof, and combinations thereof. The delayed-release cement set activator may comprise an outer coating selected from the group consisting of polysaccharides, chitins, lipids, latex, wax, chitosans, proteins, aliphatic polyesters, poly(lactides), poly (glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof. The delayed-release cement set activator may be present in an amount of about 0.01% to about 10% by weight of the extended-life cement composition. The extended-life cement composition may further comprise at least one dispersant selected from the group consisting of a sulfonated-formaldehyde-based dispersant, a polycarboxylated ether dispersant, and any combination thereof; wherein the dispersant is present in an amount of about 0.01% to about 5% by weight of the extended-life cement composition. The extended-life cement composition may further comprise at least one lithium salt selected from the group consisting of lithium sulfate, lithium carbonate, and any combination thereof; wherein the lithium salt is present in an amount of about 0.01% to about 10% by weight of the extended-life cement composition. The method may further comprise pumping the extended-life cement composition through a conduit and into a wellbore annulus that is penetrating the subterranean formation. The method may further comprise storing the extended-life cement composition for a time period of at least about 7 days or longer prior to introducing the extended-life cement composition.

An extended-life cementing composition for cementing may be provided. The extended-life cementing composition may be used in conjunction with one or more of the methods, compositions, and/or systems illustrated in FIGS. 1-3. The extended-life cementing composition may comprise calcium-aluminate cement, water, a cement set retarder, and a delayed-release cement set activator. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The delayed-release cement set activator may be selected from the group consisting of Groups IA and IIA hydroxides; alkaline aluminates; Portland cement, and the like. The delayed-release cement set activator may comprise a binder selected from the group consisting of silica gel, aluminosilicate, chitosan, cellulose, derivatives thereof, and combinations thereof. The delayed-release cement set activator may comprise an outer coating selected from the group consisting of polysaccharides, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof. The delayed-release cement set activator may be present in an amount of about 0.01% to about 10% by weight of the extended-life cement composition. The extended-life cement composition may further comprise at least one dispersant selected from the group consisting of a sulfonated-formaldehyde-based dispersant, a polycarboxylated ether dispersant, and any combination thereof; wherein the dispersant is present in an amount of about 0.01% to about 5% by weight of the extended-life cement composition. The extended-life cement composition may further comprise at least one lithium salt selected from the group consisting of lithium sulfate, lithium carbonate, and any combination thereof; wherein the lithium salt is present in an amount of about 0.01% to about 10% by weight of the extended-life cement composition.

A system for cementing may be provided. The system may be used in conjunction with one or more of the methods, compositions, and/or systems illustrated in FIGS. 1-3. The system may comprise an extended-life cement composition comprising: calcium aluminate cement, water, a cement set retarder, and a delayed-release cement set activator; mixing equipment capable of mixing the extended-life cement composition; pumping equipment capable of pumping the extended-life cement composition through a conduit and into a wellbore annulus that is penetrating the subterranean formation. The system may further comprise a vessel capable of storing the extended-life cement composition. The cement set retarder may be selected from the group consisting of hydroxycarboxylic acids or their respective salts, boric acid or its respective salt, and any combination thereof. The cement set retarder may be present in an amount of about 0.01% to about 10% by weight of the extended-life cement composition. The delayed-release cement set activator may be selected from the group consisting of Groups IA and IIA hydroxides; alkaline aluminates; Portland cement, and the like. The delayed-release cement set activator may comprise a binder selected from the group consisting of silica gel, aluminosilicate, chitosan, cellulose, derivatives thereof, and combinations thereof. The delayed-release cement set activator may comprise an outer coating selected from the group consisting of polysaccharides, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof. The delayed-release cement set activator may be present in an amount of about 0.01% to about 10% by weight of the extended-life cement composition. The extended-life cement composition may further comprise at least one dispersant selected from the group consisting of a sulfonated-formaldehyde-based dispersant, a polycarboxylated ether dispersant, and any combination thereof; wherein the dispersant is present in an amount of about 0.01% to about 5% by weight of the extended-life cement composition. The extended-life cement composition may further comprise at least one lithium salt selected from the group consisting of lithium sulfate, lithium carbonate, and any combination thereof; wherein the lithium salt is present in an amount of about 0.01% to about 10% by weight of the extended-life cement composition.

Referring now to FIG. 1, preparation of an extended-life cement composition will now be described. FIG. 1 illustrates a system 2 for the preparation of an extended-life cement composition and subsequent delivery of the composition to a wellbore. As shown, the extended-life cement composition may be mixed in mixing equipment 4, such as a jet mixer, re-circulating mixer, or a batch mixer, for example, and then pumped via pumping equipment 6 to the wellbore. The mixing equipment 4 and the pumping equipment 6 may be disposed on one or more cement trucks as will be apparent to those of ordinary skill in the art. A delayed-release cement set activator may be added to the mixing equipment 4 or may be added to the pumping equipment 6. The delayed-release cement set activator may be dry blended with the extended-life cement composition if desired. Alternatively, a delayed-release cement set activator may be added to an extended-life cement composition after the extended-life cement composition has been pumped into the wellbore. When a delayed-release cement set activator is added to the mixing equipment, a jet mixer may be used, for example, to continuously mix the cement set activator and the extended-life cement composition as it is being pumped to the wellbore.

Alternatively, a re-circulating mixer and/or a batch mixer may be used to mix the extended-life cement composition and the delayed-release cement set activator, and the delayed-release cement set activator may be added to the mixer as a powder prior to pumping the extended-life cement composition downhole. Additionally, batch mixer type units may be plumbed in line with a separate tank containing a delayed-release cement set activator. The delayed-release cement set activator may then be fed in-line with the extended-life cement composition as it is pumped out of the mixing unit. There is required method for preparing or mixing the extended-life cement compositions and one having ordinary skill in the art should be readily able to prepare, mix, and pump the extended-life cement compositions using their expertise.

Figure 2:
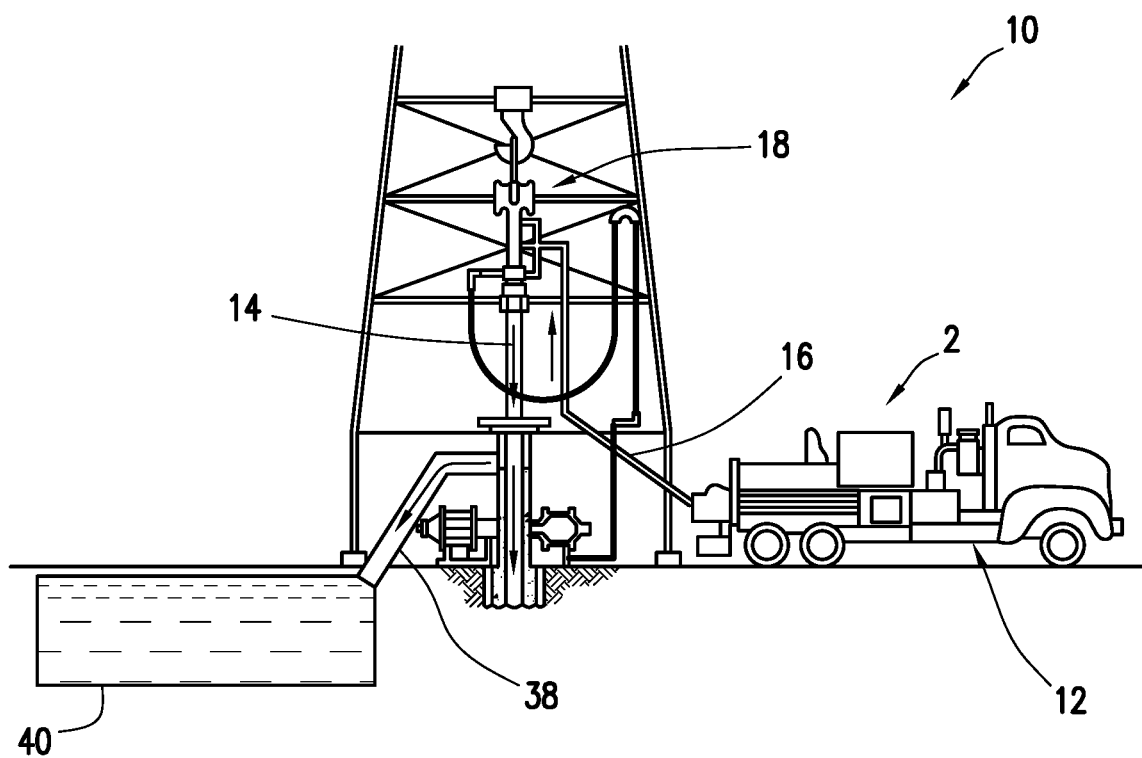
FIG. 2 illustrates surface equipment that may be used in placement of an extended-life calcium aluminate cement composition in a wellbore in accordance with certain examples.

An example technique for placing an extended-life cement composition into a subterranean formation will now be described with reference to FIGS. 2 and 3. FIG. 2 illustrates surface equipment 10 that may be used in placement of an extended-life cement composition in accordance with certain embodiments. It should be noted that while FIG. 2 generally depicts a land-based operation, those skilled in the art will readily recognize that the principles described herein are equally applicable to subsea operations that employ floating or sea-based platforms and rigs, without departing from the scope of the disclosure. As illustrated by FIG. 2, the surface equipment 10 may include a cementing unit 12, which may include one or more cement trucks. The cementing unit 12 may include the mixing equipment 4 and the pumping equipment 6 shown in FIG. 1 which is represented by system 2 on the cementing unit 12, as will be apparent to those of ordinary skill in the art. The cementing unit 12 may pump an extended-life cement composition 14 through a feed pipe 16 and to a cementing head 18 which conveys the extended-life cement composition 14 downhole.

Figure 3:
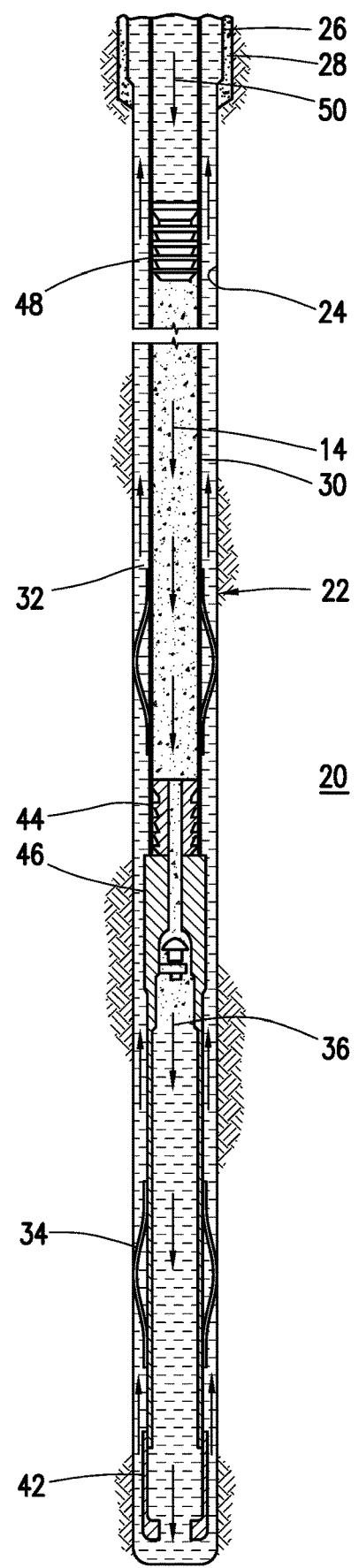
FIG. 3 illustrates placement of an extended-life calcium aluminate cement composition into a wellbore annulus in accordance with certain examples.

Turning now to FIG. 3, placing the extended-life cement composition 14 into a subterranean formation 20 will now be described. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. As illustrated, a surface casing 26 has been inserted into the wellbore 22. The surface casing 26 may be cemented to the walls 24 of the wellbore 22 by cement sheath 28. One or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 3, the extended-life cement composition 14 may be pumped down the interior of the casing 30. The extended-life cement composition 14 may be allowed to flow down the interior of the casing 30, through the casing shoe 42 at the bottom of the casing 30, and up around the casing 30 into the wellbore annulus 32. The extended-life cement composition 14 may be allowed to set in the wellbore annulus 32, for example, to form a cement sheath that supports and positions the casing 30 in the wellbore 22. While not illustrated, other techniques may also be utilized for introduction of the extended-life cement composition 14. By way of example, reverse circulation techniques may be used that include introducing the extended-life cement composition 14 into the subterranean formation 20 by way of the wellbore annulus 32 instead of through the casing 30.

As it is introduced, the extended-life cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2. Referring again to FIG. 3, a bottom plug 44 may be introduced into the wellbore 22 ahead of the extended-life cement composition 14, for example, to separate the extended-life cement composition 14 from the fluids 36 that may be inside the casing 30 prior to cementing. After the bottom plug 44 reaches the landing collar 46, a diaphragm or other suitable device should rupture to allow the extended-life cement composition 14 through the bottom plug 44. In FIG. 3, the bottom plug 44 is shown on the landing collar 46. As illustrated, a top plug 48 may be introduced into the wellbore 22 behind the extended-life cement composition 14. The top plug 48 may separate the extended-life cement composition 14 from a displacement fluid 50 and also push the extended-life cement composition 14 through the bottom plug 44.

The exemplary extended-life cement compositions disclosed herein may directly or indirectly affect one or more components or pieces of equipment associated with the preparation, delivery, recapture, recycling, reuse, and/or disposal of the disclosed extended-life cement compositions. For example, the disclosed extended-life cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary extended-life cement compositions. The disclosed extended-life cement compositions may also directly or indirectly affect any transport or delivery equipment used to convey the extended-life cement compositions to a well site or downhole such as, for example, any transport vessels, conduits, pipelines, trucks, tubulars, and/or pipes used to compositionally move the extended-life cement compositions from one location to another, any pumps, compressors, or motors (e.g., topside or downhole) used to drive the extended-life cement compositions into motion, any valves or related joints used to regulate the pressure or flow rate of the extended-life cement compositions, and any sensors (i.e., pressure and temperature), gauges, and/or combinations thereof, and the like. The disclosed extended-life cement compositions may also directly or indirectly affect the various downhole equipment and tools that may come into contact with the extended-life cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

EXAMPLES

To facilitate a better understanding of the present claims, the following examples of certain aspects of the disclosure are given. In no way should the following examples be read to limit, or define, the entire scope of the claims.

Example 1

An extended-life cement composition sample was obtained which comprised about 40% to about 70% calcium aluminate cement by weight, about 33% to about 200% water by weight, about 0.01% to about 10% cement set retarder by weight, and about 0.01% to about 5% dispersant by weight. In the examples, the terms "by weight" or "by wt." refers to by weight of the extended-life cement composition. The extended-life cement composition was obtained from Kerneos, Inc., Chesapeake, Va.; as a retarded calcium-aluminate system comprising a suspension of calcium-aluminate cement that was 40-70% solids. The calculated density of the extended-life cement composition was 14.68 lb/gal.

The sample was split into five identical samples and four of these samples were activated by the addition of a 4M NaOH (aq.) solution. The thickening times of the four experimental samples and the control sample were measured on a high-temperature high-pressure consistometer by ramping from room temperature (e.g., about 70° F. for this example) and ambient pressure to 100° F. and 3000 psi in 15 minutes in accordance with the procedure for determining cement thickening times set forth in API RP Practice 10B-2, *Recommended Practice for Testing Well Cements*, First Edition, July 2005. The thickening time is the time for the treatment fluid to reach 70 Bc and may be reported as the time to reach 70 Bc. Additionally the pH of each sample was measured after each sample had been activated. The results of this test are set forth below in Table 1.

TABLE 1

Extended-Life Cement Composition Thickening Time Measurements

| Cement Set Activator Amount (% by wt.) | Thickening Time (hrs.) | pH |
|---|---|---|
| 4 | 2 | 12.3 |
| 2 | 6 | 10.6 |
| 1.5 | 19 | 9.6 |
| 1 | 190+ | 8.5 |
| 0 | — | 6.3 |

It was discovered that control over thickening times may be achieved by varying the concentration of the cement set activator. The results indicate a dependence on concentration of the activator and the pH of the activated extended-life cement composition.

The preceding description provides various embodiments of the systems and methods of use disclosed herein which may contain different method steps and alternative combinations of components. It should be understood that, although individual embodiments may be discussed herein, the present disclosure covers all combinations of the disclosed embodiments, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and may be modified and practiced in different but equivalent manners apparent to those skilled in the art having the benefit of the teachings herein. Although individual embodiments are discussed, the disclosure covers all combinations of all of the embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or term in this specification and one or more patent(s) or other documents that may be incorporated herein by reference, the definitions that are consistent with this specification should be adopted.

What is claimed is:

1. A method of cementing comprising:
   storing a cement composition comprising calcium-aluminate cement, water, a cement set retarder, and a cement set activator in a pumpable fluid state for at least about 1 day, wherein the cement set activator comprises an alkaline species for increasing pH of the cement composition to induce activation, wherein the alkaline species is bound and/or encapsulated such that the activation does not occur during the storing;
   introducing the cement composition into a subterranean formation; and
   allowing the cement composition to set in the subterranean formation;
   wherein the cement composition has a thickening time of about two hours or longer, and wherein the calcium-aluminate cement comprises calcium aluminates in an amount greater than 50% by weight of dry calcium aluminate cement.

2. The method of claim 1, wherein the cement set retarder is selected from the group consisting of hydroxycarboxylic acids or their respective salts, boric acid or its respective salt, and any combination thereof.

3. The method according of claim 1, wherein the cement set retarder is present in an amount of about 0.01% to about 10% by weight of the cement composition.

4. The method of claim 1, wherein the cement set activator is selected from the group consisting of Groups IA and IIA hydroxides; alkaline aluminates; Portland cement, and combinations thereof.

5. The method of claim 1, wherein the cement set activator comprises a binder selected from the group consisting of silica gel, aluminosilicate, chitosan, cellulose, derivatives thereof, and combinations thereof.

6. The method of claim 1, wherein the cement set activator comprises an outer coating selected from the group consisting of polysaccharides, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof.

7. The method of claim 1, wherein the cement set activator is present in an amount of about 0.01% to about 10% by weight of the cement composition.

8. The method of claim 1, wherein the cement composition further comprises at least one dispersant selected from the group consisting of a sulfonated-formaldehyde-based dispersant, a polycarboxylated ether dispersant, and any combination thereof; wherein the dispersant is present in an amount of about 0.01% to about 5% by weight of the cement composition.

9. The method of claim 1, wherein the cement composition further comprises at least one lithium salt selected from the group consisting of lithium sulfate, lithium carbonate, and any combination thereof; wherein the lithium salt is present in an amount of about 0.01% to about 10% by weight of the cement composition.

10. The method of claim 1, further comprising pumping the cement composition through a conduit and into a wellbore annulus that is penetrating the subterranean formation.

11. The method of claim 1, further comprising storing the cement composition for a time period of at least about 7 days or longer prior to introducing the cement composition.

12. A cement composition comprising:
calcium-aluminate cement, wherein the calcium-aluminate cement comprises calcium aluminates in an amount greater than 50% by weight of dry calcium aluminate cement,
water,
a cement set retarder that provides a barrier to hydration of the calcium-aluminate cement such that the cement composition is capable of remaining in a pumpable state in quiescent storage for a period of about one day or longer, and
a cement set activator for increasing pH of the cement composition to induce activation, wherein the cement set activator is an alkaline species bound and/or encapsulated such that the activation of the cement composition does not occur during storing the cement composition.

13. The composition of claim 12, wherein the cement set retarder is selected from the group consisting of hydroxycarboxylic acids or their respective salts, boric acid or its respective salt, and any combination thereof; wherein the cement set retarder is present in an amount of about 0.01% to about 10% by weight of the cement composition.

14. The composition of claim 12, wherein the cement set activator is selected from the group consisting of Groups IA and IIA hydroxides; alkaline aluminates; Portland cement, and combinations thereof.

15. The composition of claim 12, wherein the cement set activator comprises a binder selected from the group consisting of silica gel, aluminosilicate, chitosan, cellulose, derivatives thereof, and combinations thereof.

16. The composition of claim 12, wherein the cement set activator comprises an outer coating selected from the group consisting of polysaccharides, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof.

17. The composition of claim 12, wherein the cement set activator is present in an amount of about 0.01% to about 10% by weight of the cement composition.

18. A system for cementing a subterranean formation comprising:
a cement composition comprising:
calcium aluminate cement, wherein the calcium-aluminate cement comprises calcium aluminates in an amount greater than 50% by weight of dry calcium aluminate cement,
water,
a cement set retarder that provides a barrier to hydration of the calcium-aluminate cement such that the cement composition is capable of remaining in a pumpable state in quiescent storage for a period of about one day or longer, and
a cement set activator for increasing pH of the cement composition to induce activation, wherein the cement set activator is an alkaline species bound and/or encapsulated such that the activation of the cement composition does not occur during storing the cement composition;
mixing equipment capable of mixing the cement composition;
pumping equipment capable of pumping the cement composition through a conduit and into a wellbore annulus that is penetrating the subterranean formation.

19. The system of claim 18, further comprising a vessel capable of storing the cement composition.

20. The system of claim 18, wherein the cement set activator comprises a binder selected from the group consisting of silica gel, aluminosilicate, chitosan, cellulose, derivatives thereof, and combinations thereof; wherein the delayed-release cement set activator further comprises an outer coat selected from the group consisting of polysaccharides, chitins, lipids, latex, wax, chitosans, proteins, aliphatic polyesters, poly(lactides), poly(glycolides), poly(ε-caprolactones), poly(hydroxybutyrates), poly(anhydrides), aliphatic polycarbonates, orthoesters, poly(orthoesters), poly(amino acids), poly(ethylene oxides), polyphosphazenes, derivatives thereof, copolymers thereof, and combinations thereof.

* * * * *